(12) United States Patent
Eisen et al.

(10) Patent No.: US 11,083,145 B1
(45) Date of Patent: Aug. 10, 2021

(54) PLANTER SYSTEM

(71) Applicants: Richard J Eisen, Boca Raton, FL (US); Eric Schneider, Delray Beach, FL (US); Roseann Pascale, Delray Beach, FL (US); Andrea Eisen, Boca Raton, FL (US)

(72) Inventors: Richard J Eisen, Boca Raton, FL (US); Eric Schneider, Delray Beach, FL (US); Roseann Pascale, Delray Beach, FL (US); Andrea Eisen, Boca Raton, FL (US)

(*) Notice: Subject to any disclaimer, the term of this patent is extended or adjusted under 35 U.S.C. 154(b) by 0 days.

(21) Appl. No.: 17/100,854

(22) Filed: Nov. 21, 2020

(51) Int. Cl.
*A01G 13/02* (2006.01)
*A01G 9/12* (2006.01)
*A01G 9/02* (2018.01)

(52) U.S. Cl.
CPC .......... *A01G 13/0268* (2013.01); *A01G 9/02* (2013.01); *A01G 9/12* (2013.01); *A01G 13/0287* (2013.01)

(58) Field of Classification Search
CPC .. A01G 13/0268; A01G 13/0287; A01G 9/02; A01G 9/12; A01G 9/45
USPC ........................................................... 47/32
See application file for complete search history.

(56) References Cited

U.S. PATENT DOCUMENTS

| | | | | |
|---|---|---|---|---|
| 1,534,508 A * | 4/1925 | Earp-Thomas | ........ | A01C 1/025 47/66.2 |
| 2,300,776 A * | 11/1942 | Collins | .................. | A01G 9/029 47/69 |
| 3,961,443 A * | 6/1976 | Insalaco | .................... | A01G 9/00 47/32 |
| 4,173,097 A | 11/1979 | Staby | | |
| 4,277,891 A * | 7/1981 | Dick | .......................... | B26B 9/02 30/316 |
| 4,285,164 A * | 8/1981 | Moore | ...................... | A01G 9/16 47/69 |
| 4,403,443 A * | 9/1983 | Valente | .............. | A01G 13/0281 47/32 |
| 4,712,329 A * | 12/1987 | Anderson | ................ | A01G 9/02 47/84 |
| 4,794,728 A * | 1/1989 | Tsukada | .................. | A01G 31/02 47/64 |
| 4,995,192 A * | 2/1991 | DeWid | ............... | A01G 13/0237 47/20.1 |
| 5,241,783 A | 9/1993 | Krueger | | |
| 5,315,783 A * | 5/1994 | Peng | ...................... | A01G 27/00 47/31.1 |
| D397,277 S * | 8/1998 | Gibbs, Jr. | ...................... | D7/672 |
| 6,079,156 A * | 6/2000 | Colovic | .................. | A01G 27/04 47/81 |
| 7,454,864 B2 | 11/2008 | Smith et al. | | |
| 7,647,726 B2 * | 1/2010 | Gallo | .................. | A01G 13/0281 47/31.1 |
| 7,946,078 B1 | 5/2011 | Van Wingerden | | |

(Continued)

FOREIGN PATENT DOCUMENTS

| GB | WO 97/27732 | * | 8/1997 | ............... | A01G 9/12 |
| GB | 2410169 A | * | 7/2005 | ............... | A01G 9/12 |
| GB | 2473645 A | * | 9/2009 | ............... | A01G 9/12 |

*Primary Examiner* — Ebony E Evans

(57) ABSTRACT

A planter for a bag including a growing medium where the bag is used for growing at least one of a seed and plant includes a base used for placement under the bag and at least one bag piercing element attached to the base where each bag piercing element includes at least one opening for liquid drainage below the base and projects upwardly from the base.

30 Claims, 6 Drawing Sheets

(56) References Cited

U.S. PATENT DOCUMENTS

| | | | |
|---|---|---|---|
| 8,381,440 B1* | 2/2013 | Jabs | A01G 13/0281 47/66.7 |
| 9,248,955 B2* | 2/2016 | Aardenburg | B65D 85/8043 99/298 |
| 9,462,758 B2* | 10/2016 | Blaha | A01G 13/00 |
| 10,004,352 B2* | 6/2018 | Deuber | A47J 31/3695 |
| 10,412,902 B2 | 9/2019 | Van Wingerden | |
| 10,472,165 B2* | 11/2019 | Empl | A23F 5/262 |
| 2007/0144069 A1* | 6/2007 | Gottlieb | A01G 9/023 47/82 |
| 2015/0040474 A1 | 2/2015 | Lee et al. | |

* cited by examiner

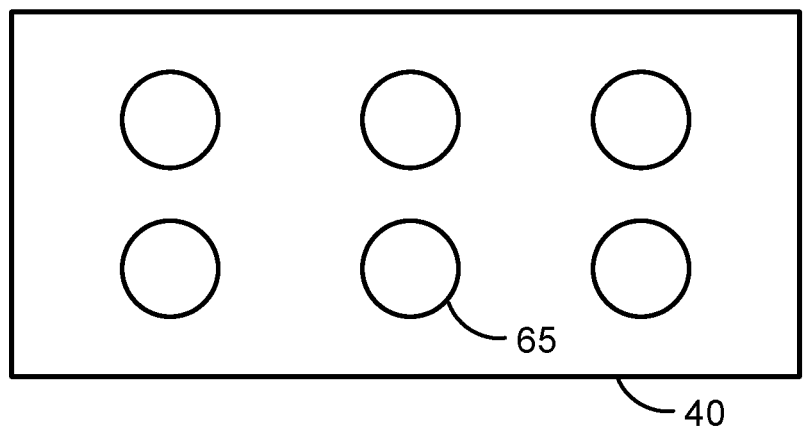
Fig. 2-A
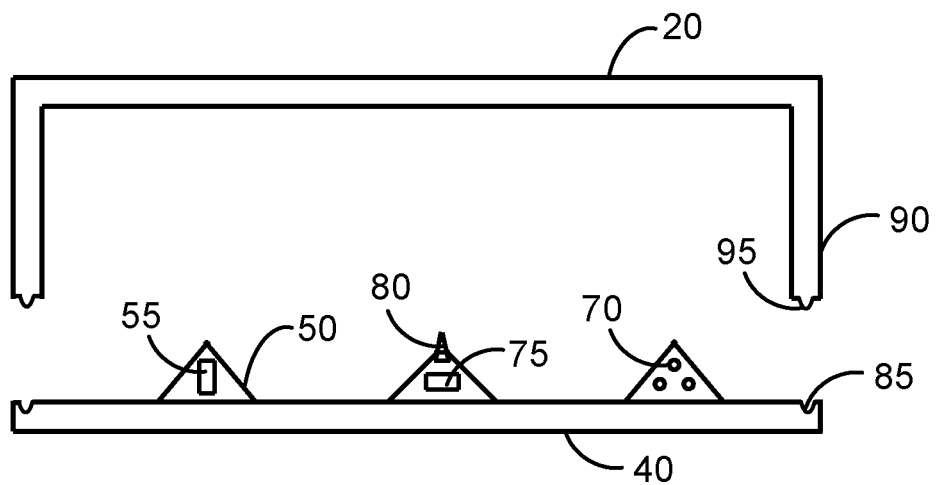
Fig. 2-B

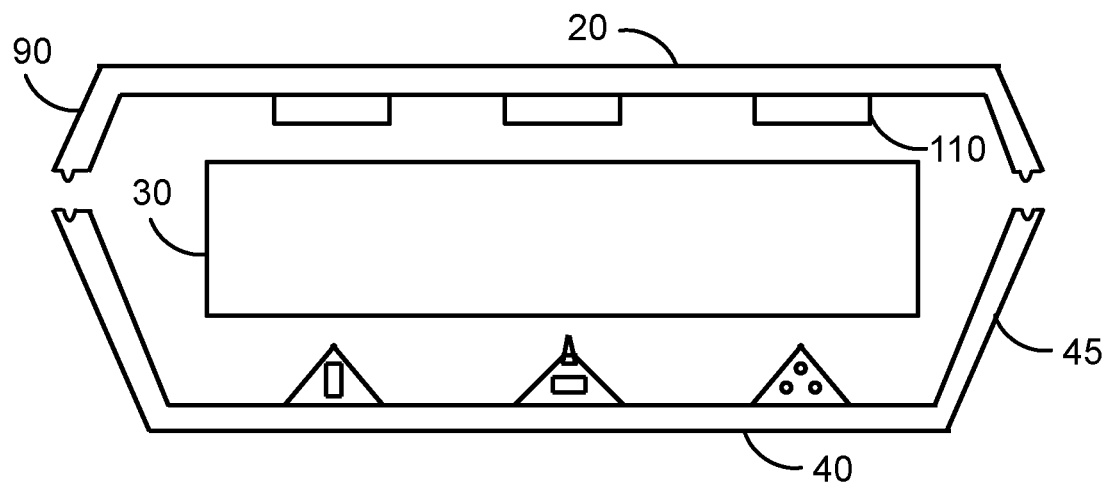
Fig. 3-A
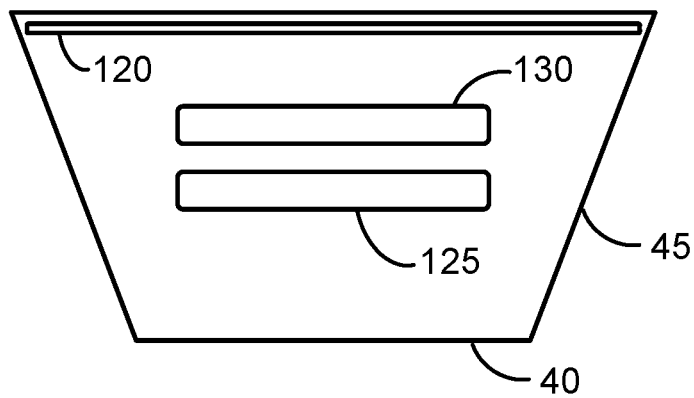
Fig. 3-B
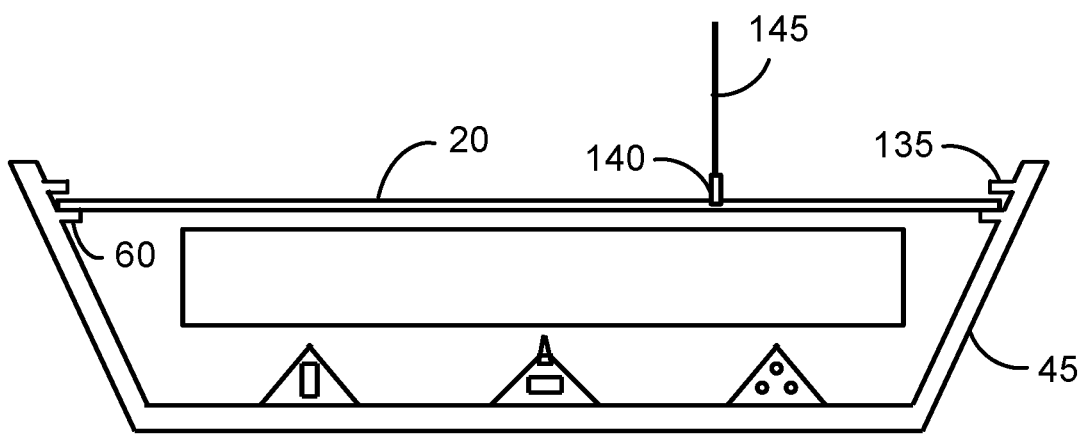
Fig. 3-C

PLANTER SYSTEM

FIELD OF THE INVENTION

The present invention relates generally to planters for the propagation of vegetation and, more particularly, to a planter adapted to grow plants or seeds in a bag having a growing medium.

BACKGROUND OF THE INVENTION

Many horticultural hobbyists and home gardeners use planters to propagate plants from seeds or seedlings. Some hobbyists bypass the use of planters and instead propagate plants from seeds or seedlings directly within a potting soil bag.

It is a known technique among some gardeners to grow plants using a soil bag as a substitute for a planter. They use a knife to cut out several drainage holes on the bottom of the potting soil bag and cut out a portion of the top of the bag for planting seeds to water and grow plants by using the soil bag as a makeshift planter. However there are several drawbacks to planting with this technique including soil and water seeping from the bottom of the soil bag, having to excessively handle the soil bag to manually cut holes on both sides, and the loss of visual aesthetic that otherwise may have been enjoyed with the use of a planter.

Accordingly, in light of the above, there is a strong need in the art for a planter adapted to grow plants or seeds in a bag having a growing medium.

SUMMARY OF THE INVENTION

The present invention enables growing seeds and plants inside a bag of growing medium with a planter system. The present invention enables piercing the bottom of a bag of growing medium by dropping it onto one or more bag piercing elements attached to a planter. The present invention enables piercing and cutting the top of a bag of growing medium with the use of a novel bag hole cutter and other piercing and cutting methods.

The present invention enables the minimization of the handling of growing medium while collecting any excess soil and water within the planter. The present invention permits a user to quickly change and replace interchangeable decorative top covers that rest on top of the planter system. The present invention enables a novel visual aesthetic through the use of a planter and top cover system while growing seeds and plants from within a bag of growing medium. The present invention hides the bag of growing medium from view so an observer would have no knowledge that a plant was growing inside of the bag. The present invention eliminates the need for additional separate planting pots thereby conserving the environment and saving cost to a user.

In general, in accordance with the present invention, a planter for a bag including a growing medium, the bag used for growing at least one of a seed and plant includes a base used for placement under the bag, and at least one bag piercing element attached to the base where each bag piercing element includes at least one opening for liquid drainage below the base and projects upwardly from the base.

In accordance with an aspect of the present invention, a bag hole cutter for piercing and cutting a hole in a bag including a growing medium includes a circular plate having a diameter, a handle attached to a top of the circular plate, and a top of a tubular side wall integrally formed to a bottom of the circular plate, the tubular side wall having the same diameter as the circular plate wherein a bottom of the tubular side wall includes a plurality of cutting teeth adapted to pierce and cut a hole in the bag including the growing medium upon twisting the handle of the bag hole cutter upon the bag including the growing medium.

In accordance with another aspect of the present invention, a top cover for a bag including a growing medium, the bag used for growing at least one of a seed and plant includes the top cover having at least one opening for placement over the bag and at least one bag piercing element attached to a bottom perimeter of each top cover opening adapted to pierce a top of the bag upon the placement over the bag.

In accordance with yet another aspect of the present invention, a method for growing at least one of a seed and plant inside a bag of growing medium includes dropping the bag upon at least one bag piercing element attached to a planter base where each bag piercing element includes at least one opening for liquid drainage below the planter base and projects upwardly from the planter base, cutting at least one hole in a top of the bag to expose the growing medium, planting the at least one of a seed and plant inside the growing medium, and watering the at least one of a seed and plant.

BRIEF DESCRIPTION OF THE DRAWINGS

FIG. 2-A is a bottom view of a planter base in accordance with the present invention.

FIG. 2-B is a cross-section view of a planter system in accordance with the present invention.

FIG. 3-A is a cross-section view of an alternate planter system in accordance with the present invention.

FIG. 3-B is a side view of a planter base in accordance with the present invention.

FIG. 3-C is a cross-section view of an additional alternate planter system in accordance with the present invention.

DETAILED DESCRIPTION OF THE INVENTION

Figure 1:
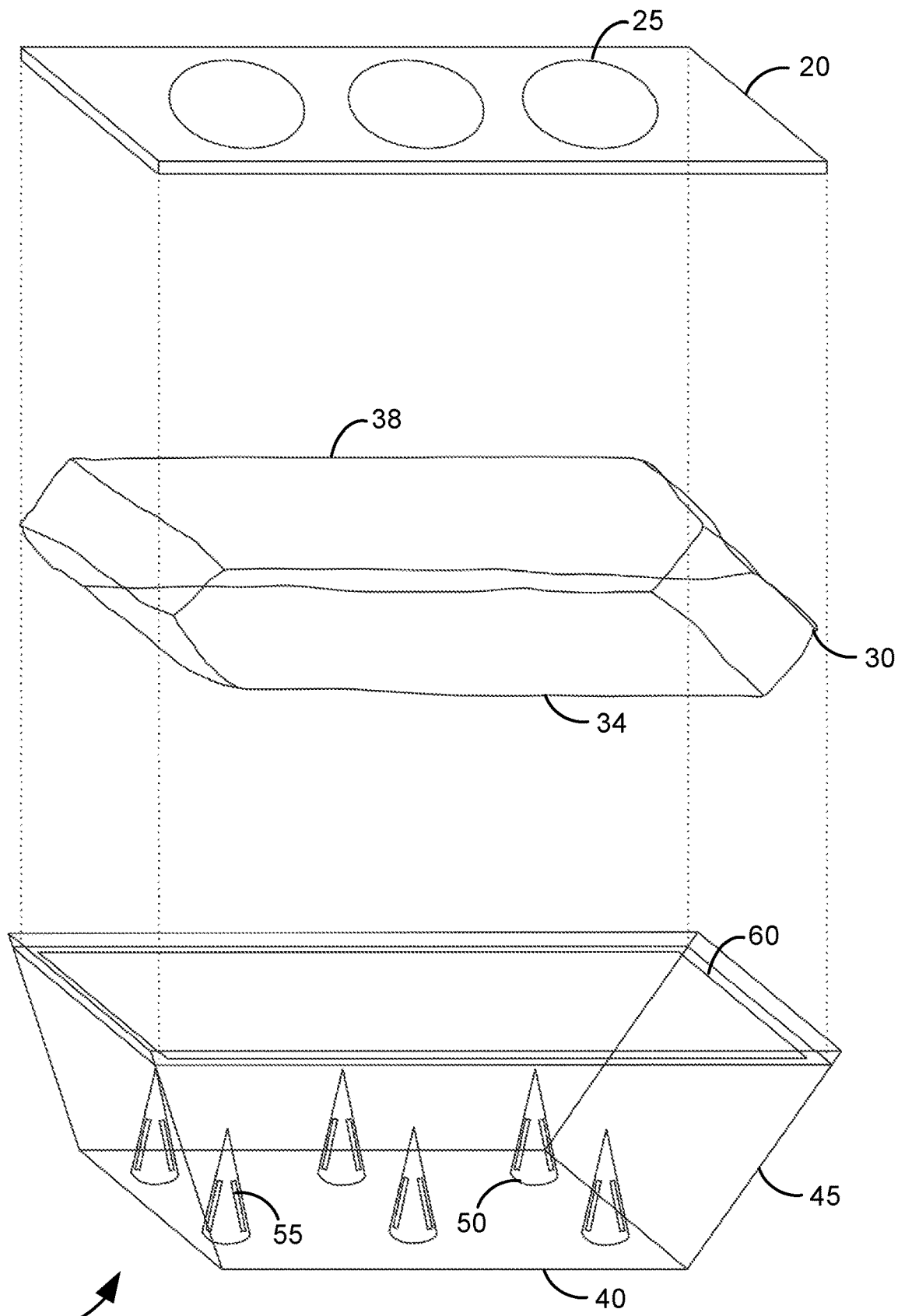
FIG. 1 is a perspective view of an example planter system in accordance with the present invention.

The present invention will now be described with reference to the drawings, wherein like reference numerals are used to refer to like elements throughout.

FIG. 1 is a perspective view of an example planter system in accordance with the present invention. A planter system 10 includes a top cover 20 with at least one opening 25 for one or more plants to grow through, a bag 30 filled with a growing medium, and a planter including a base 40 with side walls 45 upwardly extending away from the perimeter of the base 40 where the perimeter of the top of the side walls 45 is greater than the perimeter of the base 40. The planter base 40 further includes at least one bag piercing element 50 attached to the base 40 where each bag piercing element 50 includes at least one opening 55 for liquid drainage below the base 40 and projects upwardly from the base 40. The bag piercing element 50 can be integrally formed with the base 40 and rigidly attached thereto to form a unified planter assembly. The bag piercing element 50 is generally conical in shape having a sharp apex adapted to pierce the bottom 34 of the bag 30 and at least one drainage opening 55 positioned along a lateral surface of the bag piercing element 50.

With this planter system 10 the bag 30 filled with a growing medium can be dropped onto the one or more bag piercing elements 50 which would enable liquid from within the bag 30 to flow through the openings 55 of each bag piercing element 50 and drain underneath the planter base 40. The action of dropping the bag 30 also changes the shape and dimension of the bag 30 when it falls along the side walls 45 that are upwardly extending away from the perimeter of the base 40. As the bag 30 traverses along the sloping of each side wall, the growing medium shifts and compacts in a smaller area and gains in height. The top 38 of the bag 30 can then be opened to plant seeds positioned to grow through the openings 25 of the top cover 20 which can be placed above the bag 30 and rested upon an inner ledge 60 that is integrally formed along the inner perimeter of the side walls 45 positioned near the top of the side walls 45.

The planter system can be suited for those horticultural enthusiasts seeking to grow a bed of herbs and vegetables including plants that grow well together in a soil bed or single planter such as Mediterranean herbs by grouping rosemary, oregano, sage, and thyme together or by grouping basil, cilantro, tarragon, and parsley together, for example.

The bag 30 of growing medium can usually be found in a retailer's lawn and garden section as a sealed bag of potting soil or potting mix which include ingredients such as blend of perlite, peat moss, vermiculite, and fine bark. For instance, one popular bag 30 of growing medium is Miracle-Gro Garden Soil Vegetables and Herbs 1.5 cu ft which has dimensions of 24"×16"×5.6" and weighs 48 lbs. The edges of the bag usually taper and some types of herbs need at least 7" height of growing medium to foster ideal plant growth.

The planter base 40 can be made slightly smaller than the bag 30 of growing medium with a 22" length and 14" width so that when the bag 30 of growing medium is dropped upon the bag piercing elements the upwardly extending sidewalls can reshape the bag 30 dimensions by increasing the height to 7" threshold to increase odds of ideal plant growth. Top cover openings 25 can range between 2" diameter for areas to plant seeds and up to 4" diameter for transplanting plants. Two rows of three or four top cover openings 25 are a reasonable number for the current planter base size example. The top cover serves a two-fold function; first as a mitigation to weed growth that can occur in open bed planter systems and to hide the bag 30 of growing medium such that upon looking at the planter system 10 an observer would have no idea that such plants are growing inside the original potting soil mix bag.

The bag piercing elements 50 can be spaced evenly apart with a 2" diameter and 2" height to its apex creating a sloped angle of roughly 63.5 degrees. The dimensions of planter base 40 and bag piercing elements 50 can be adjusted accordingly based on the different bag 30 dimensions and weight of products on the market. For instance, the sloped angle can be adjusted and range between forty degrees to eighty degrees by providing separate bag piercing element kits that can be screw-fitted into the planter base 40. Two rows of three to four bag piercing elements 50 are a reasonable number for the current planter base size example.

Adequate drainage is important especially if the planter is kept outdoors and exposed to rain. Herbs do not like overly wet soil making drainage an important consideration. A bag piercing element 50 with a steeper angle is preferred which makes it easier to pierce the bag 30 of growing medium when it is dropped upon the bag piercing element and provides more lateral surface area which in turn enable more surface area for more drainage openings to help the liquid drainage of say water to more easily pass through the bag 30 of growing medium.

Other popular sealed bags can come in 8 quart, 16 quart, 1 cu ft., or 2 cu ft. sizes. Different size planter bases can be made accordingly to accommodate similar results as presented in this instant invention. In general, the length and width of the base can be made between one to two inches smaller than the bag size. While most of the example dimensions shown above are predicated upon positioning the bag 30 of growing medium to achieve the lowest center of gravity, it can be appreciated by one of ordinary skill in the art to make the planter bases to taller and narrower to achieve similar results by dropping the bag 30 of growing medium with the highest center of gravity in a standing upright position. This might be applicable for transplanting a one or two larger plants that grow taller in an area with limited space.

The planter system 10 can also be made from the point of view of dropping the bag 30 of growing medium sideways into the planter base 40 similar in size of a windowsill box planter which is a very popular type of planter style that can run up to 24" in length and have a one foot width and height, for example. In short, planter bases can be made to accommodate for the three different dimensions that the bag 30 of growing medium can be dropped and placed upon the bag piercing elements 50. Additionally, the present invention is not limited to pre-existing size bags and instead custom size bags 30 of growing medium can be made to more precisely fit any pre-existing planter base 40 dimensions.

The planter system 10 enables horticultural enthusiasts to plant in sensitive locations that they might otherwise not garden near like in a pool area. Most would be inhibited to do conventional gardening so close to a pool for concern of soil being too close and the risk of the area getting messier or dirtier or even some soil accidentally get in a swimming pool. With the new planter system 10 of the instant invention, the enthusiast would be more encouraged to garden closer to the pool area because the soil remains contained in the bag 30 of growing medium with a top cover providing both a pleasing visual aesthetic while hiding the bag such that guests would not even know the plants were growing in the original bag.

FIG. 2-A is a bottom view of a planter base in accordance with the present invention. The underside of a planter base 40 includes a base opening 65 that is positioned below each bag piercing element 50 (see FIG. 1) which allows for liquid drainage below the base 40 received from the one ore more openings 55 (see FIG. 1) of each bag piercing element 50. The base 40 includes a base opening 65 corresponding to each bag piercing element 50 adapted to receive and support each bag piercing element 50 and more specifically adapted to releasably attach by one of a press-fitting, snap-fitting, and screw-fitting (not shown) each bag piercing element 50 to each corresponding base opening 65. The base 40 can also include (not shown) channels that run across the bottom through the center of each base opening 65 so that when water flows to the bottom of the base, a capillary action can displace the water through the channels to better distribute drainage underneath the base 40.

FIG. 2-B is a cross-section view of a planter system in accordance with the present invention. The planter base 40 which includes a bag piercing element 50 having at least one opening 55 for liquid drainage below the base 40 also can include alternative bag piercing opening types such as circular openings 70 or horizontal openings 75. Further, a bag piercing element 50 can also include a sheared off opening near the apex or top of the bag piercing element 50 which can be used to receive an attachable and detachable bag piercing tip 80, that can be a material stronger than plastic such as metal and capable of a sharper piercing of the bottom 34 of the bag 30 of growing medium. Such a removable bag piercing tip 80 can be attached and detached by press-fitting, snap-fitting, and screw-fitting to the bag piercing element 50. In an alternative, the top cover 20 and side walls 90 can include rounded corners and edges or the top cover can be made longer and wider than the base such that the side walls 90 extend downwardly at less than ninety degree angles to snap or press fit into the planter base 40.

The planter base 40 can also include a recess or groove 85 formed along the perimeter of the planter base 40 and the top cover 20 can include downward extending walls 90 with a rib, tongue, or protrusion 95 formed along the perimeter of the bottom of the downward extending walls 90. The rib, tongue, or protrusion 95 is designed to press-fit or snap-fit into the recess or groove 85 to releasably attach/secure the top cover 20 and planter base 40 by creating a seal between them to form the planting system 10. Such techniques of further securing the top cover 20 to the inner ledge 60 (see FIG. 1) can be applied where the top cover can include protrusions near the corners and the inner ledge can include recesses or grooves that near the corners that line up to enable the top cover 20 protrusions to be press-fitted or snap-fitted into the inner ledge 60 recesses or grooves to releasably attach/secure the top cover 20 to the inner ledge 60.

FIG. 3-A is a cross-section view of an alternate planter system in accordance with the present invention. A planter includes a top cover 20 with downwardly extending side walls 90 that are adapted to releasably attach by one of a press-fitting and snap-fitting upon the top of the side walls 45 upwardly extending away from the perimeter of the base 40. The perimeter of each top cover opening 25 includes a downwardly extending sharp lip 110 integrally formed with each top cover opening 25 and rigidly attached thereto, each sharp lip 110 adapted to pierce a top 38 of the bag 30 upon one of a press-fitting and snap-fitting the top cover 20 to the planter base 40 which enables access to the growing medium for growing at least one of a seed and plant.

FIG. 3-B is a side view of a planter base in accordance with the present invention. It illustrates one of an opposing pair of side walls 45 upwardly extending from the base 40 having a horizontal opening 120 traversing the width of each side wall 45 positioned near the intersection between an edge of the top cover and the side wall 45. The horizontal opening 120 is used to receive, give support, and hold in place at least a portion of a top cover that can be slid through the horizontal opening 120. A pair of wider openings are positioned a little above center of the side wall 45 including a lower opening 125 and upper opening 130 which form a handle for a user to lift up the planter base 40 with. These openings can also be used to air out water or smell from the bag 30 of growing medium or to have access to make side holes in the bag 30 without removing the top cover 20 in case a user chooses to create another path for water to flow out of the bag 30.

FIG. 3-C is a cross-section view of an additional alternate planter system in accordance with the present invention. In an alternate embodiment there is both a lower inner ledge 60 and an upper inner ledge 135 that are integrally formed along the inner perimeter of the side walls 45 positioned near the top of the side walls 45. The additional inner ledge can be used in conjunction with the horizontal opening 120 (see FIG. 3-B) traversing the width of each side wall 45 positioned near the intersection between an edge of the top cover and the side wall 45. This enables the top cover 20 to be slid through the horizontal opening 120 to rest and be secured between the lower inner ledge 60 and upper inner ledge 135. At least one trellis receptacle 140 can be upwardly extending from and integrally formed with a top of the top cover 20 and a trellis rod 145 can be adapted to releasably attach by one of a press-fitting, snap-fitting, and screw-fitting upon each trellis receptacle 140. The trellis receptacle can also be tubular and open ended and act as a guide to the trellis rod 145 which can be slid further down into the bag 30 of growing medium to provide further anchoring and support to better stand up to high wind environments if necessary.

Figure 4:
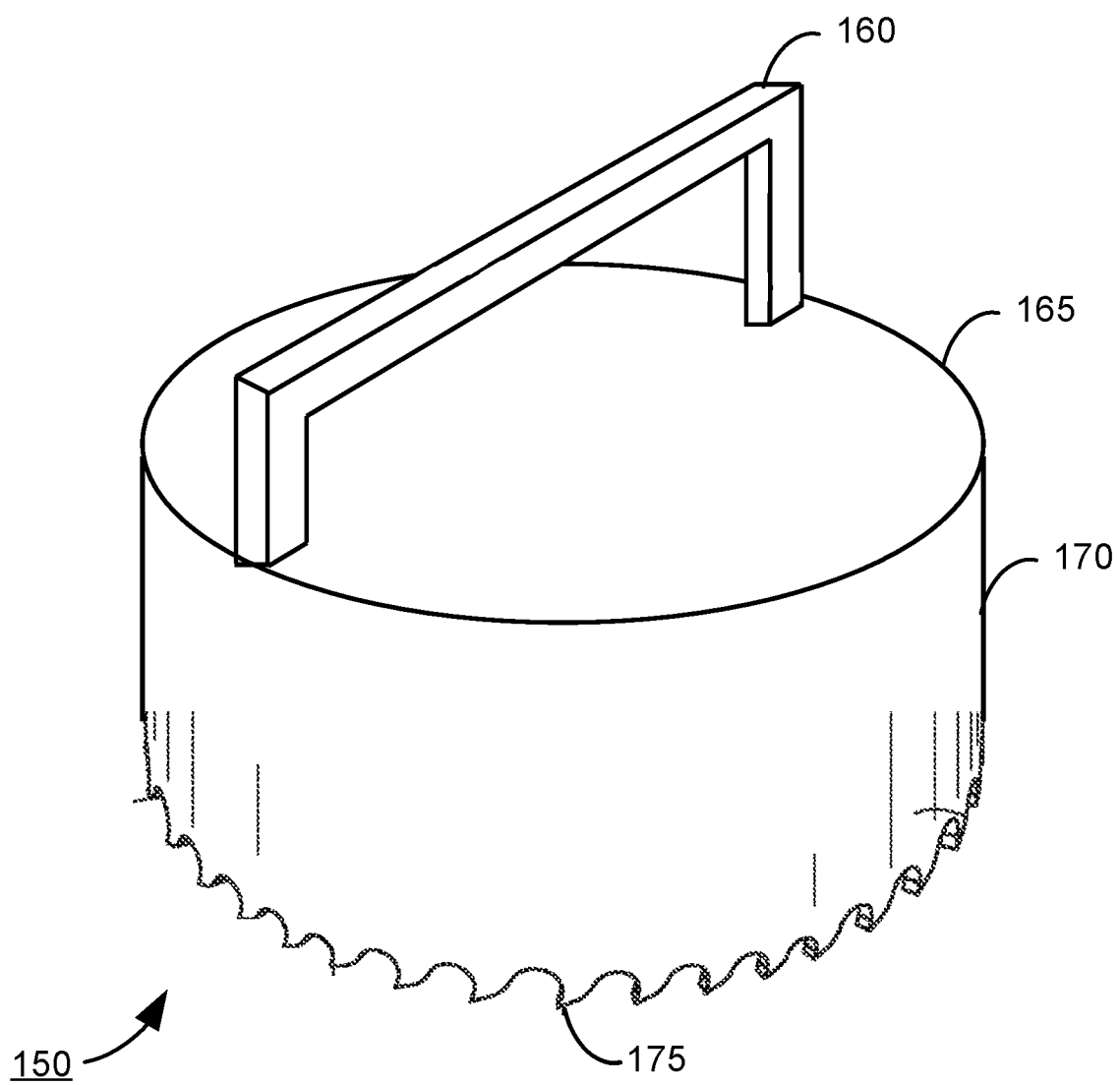
FIG. 4 is a perspective view of a bag hole cutter in accordance with the present invention.

FIG. 4 is a perspective view of an example bag hole cutter in accordance with the present invention. A bag hole cutter 150 can include a handle 160 attached to a top of a circular plate 165 having an integrally formed tubular side wall 170 attached to the bottom of the circular plate 165 where the tubular side wall 170 and circular plate 165 share the same diameter and where the bottom of the tubular side wall 170 includes a plurality of cutting teeth 175. The bag hole cutter 150 can be placed inside each opening 25 of the top cover 20 that is placed on top 38 of the bag 30 of growing medium. A user can twist turn the bag hole cutter 150 to pierce and cut a hole in the top 38 of the bag 30 of growing medium.

Figure 5:
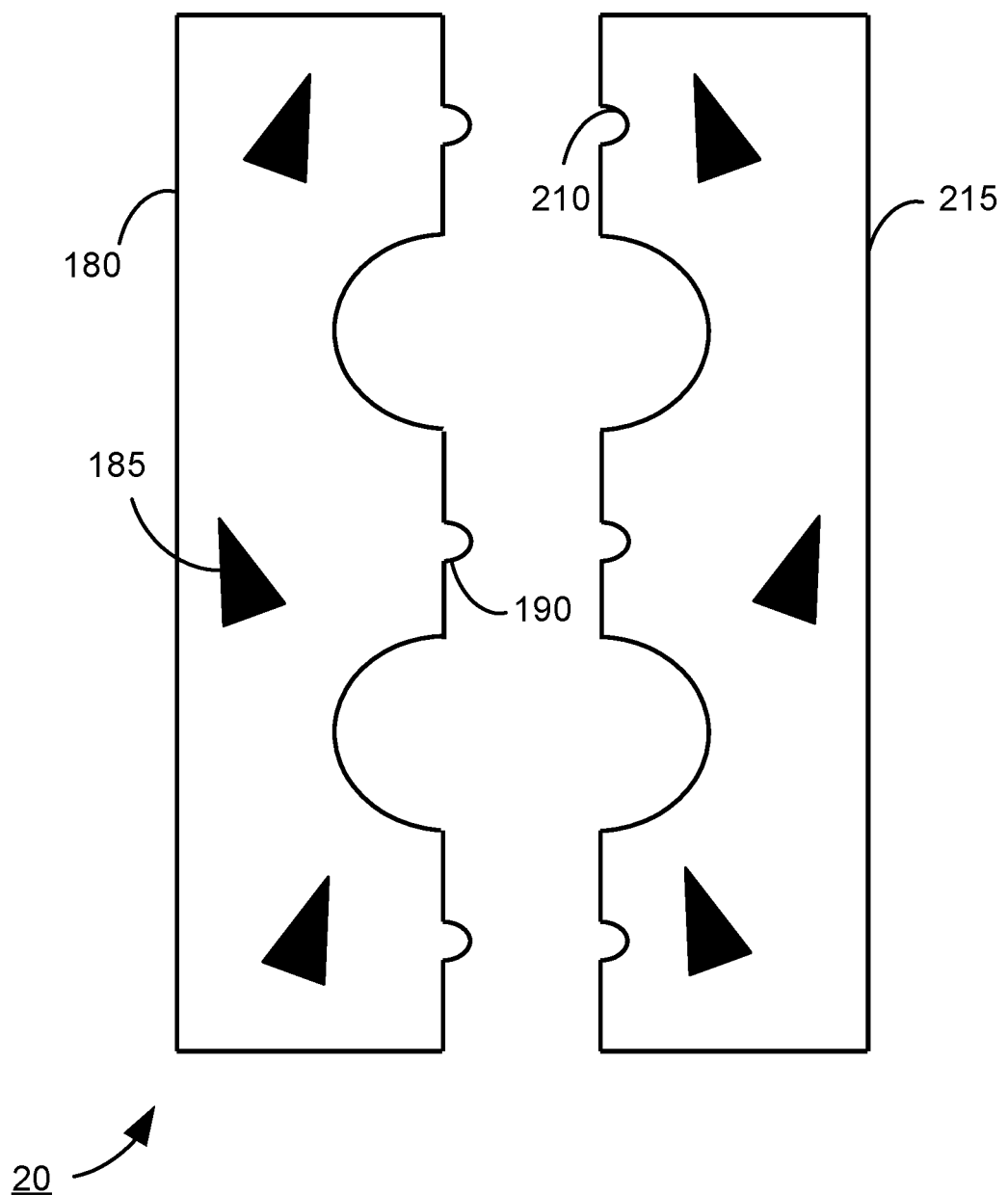
FIG. 5 is a front view of portions of a top cover in accordance with the present invention.

FIG. 5 is a front view of portions of a top cover in accordance with the present invention. A first removable interchangeable planar surface insert 180 having decorative elements 185 in this case with geometric figures includes at least one cut out (partial opening) of a first edge with a rib, tongue, or protrusion 190 adapted to slide through a first horizontal side wall opening 120 (see FIG. 3-B) and releasably attach by one of a snap-fitting or press-fitting into at least one cut out (partial opening) of a second edge with a recess or groove 210 of a second removable interchangeable decorative planar surface 215 insert adapted to slide through a second horizontal opposing side wall 120 (see FIG. 3-B) opening such that when each cut out of the first edge and each cut out of the second edge are fitted to form a top cover 20 having a single row of two openings 25 to access the growing medium 30 for growing the at least one a seed and plant. It is obvious to one of skill in the art that top cover portions can be designed to form one or more openings in a single row. The decorative elements can be customized by printing or silk screening personal images or to just about any image capable of being applied to the top cover portions (180, 215). Top cover portions can include an advertising element showing images of brand, logos, or sponsors, for example. Such top cover portions (180, 215) become particularly useful when a plant is already planted in the bag 30 of growing medium and a single top cover 20 cannot be fitted or placed on top of the plant. The top cover portions (180, 215) are attached and removed from each side of the plant to form the top cover opening 25 around the plant.

Figure 6:
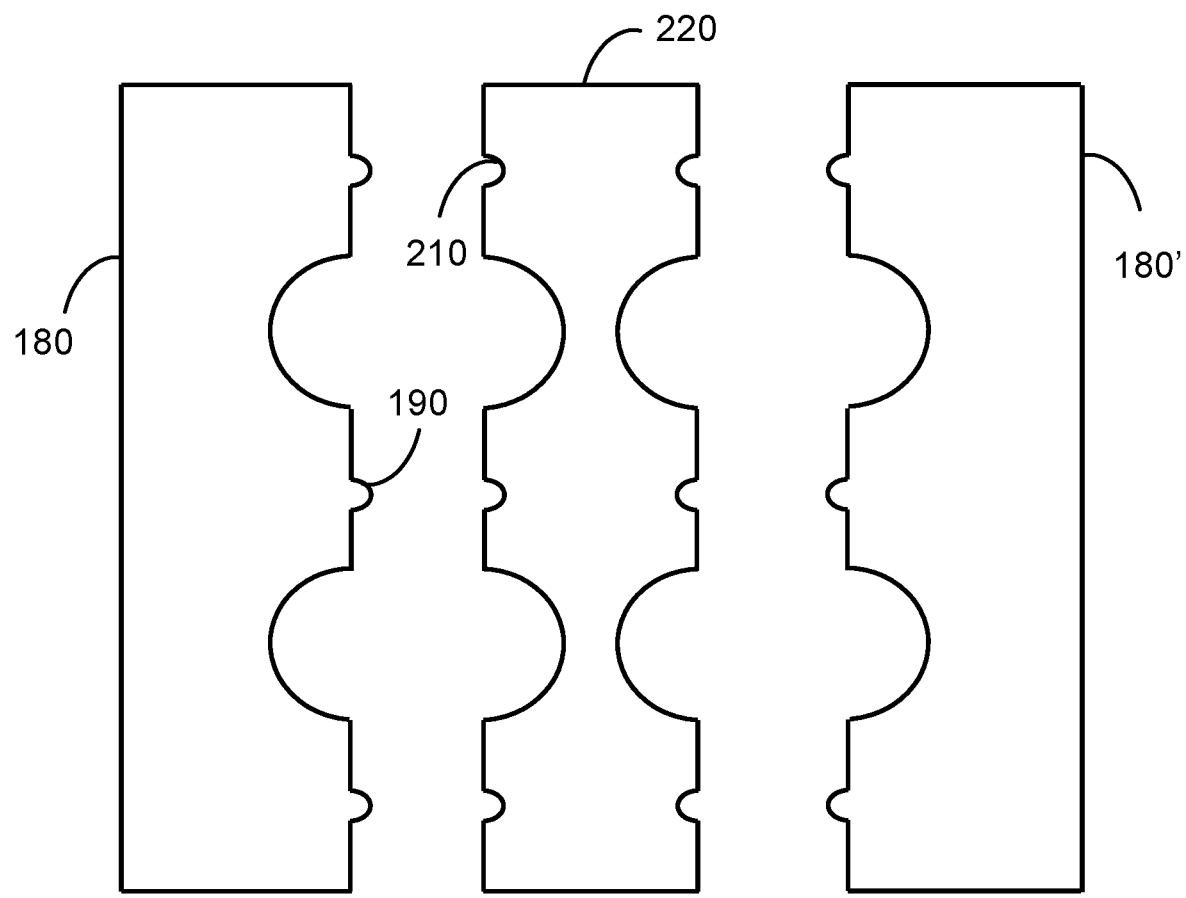
FIG. 6 is a front view of portions of a top cover to form multiple rows of one or more openings in accordance with the present invention.

FIG. 6 is a front view of portions of a top cover to form multiple rows of one or more openings in accordance with the present invention. A first removable interchangeable planar surface insert 180 and a second removable interchangeable planar surface insert 180' each include at least one cut out (partial opening) of top cover portion edge with one or more ribs, tongues, or protrusions 190. A third interchangeable planar surface insert 220 include at least one cut out (partial opening) on opposing insert edges along with one or more recesses or grooves 210 adapted to releasably attach by one of a snap-fitting or press-fitting into the one or more ribs, tongues, or protrusions 190 of the first removable interchangeable planar surface insert 180 and a second removable interchangeable planar surface insert 180' to form two rows of one or more top cover openings.

The opening of a top of the bag can be adapted to receive a liquid used for growing the at least one of a seed and plant placed in the growing medium and drain the liquid through the one or more openings of the bag piercing element after the bag is pierced upon the placement of a bottom of the bag on top of each bag piercing element.

The planter can include an inner ledge integrally formed along an inner perimeter of the side walls that is slightly sloped or angled from each edge toward the center such that when top cover portions rest upon it, any water from rain or watering that lands on the top cover portions can roll inward to the formed top cover openings and drain inside of the bag of growing medium.

A plurality of planter bases can be stackable on top of each other due to the perimeter of the top of the side walls greater than the perimeter of the base and a plurality of top covers can be stackable on top of each other due to the perimeter of the bottom of top cover side walls greater than the perimeter of the top cover.

In one alternative, The planter can include a length and width of the base slightly smaller than a length and width of the bag which aids in shrinking the area of the bottom of the bag of growing medium when it is dropped upon the bag piercing elements and slides along the sloping side walls of the planter to change its shape. The planter can also include a length and width of the base greater than a length and width of the bag and a length and width of the top cover is greater than a length and width of the base.

At least one of the planter base, the top cover, and the bag hole cutter can be printed by a three dimensional printing process or molded by a process selected from a group consisting of a blow molding and injection molding process and the material of at least on of the planter base, top cover, and bag hole cutter is a polymer selected from a group consisting of a co-polymer, polystyrene, alkyl benzene, sulfonate (ABS), polyethylene, biodegradable resin, bioplastic, and polypropylene polymer. Materials can be made or pressed from molded pulp or fiber or any other known biodegradable material. The planter system 10 elements can also be made from other materials such as metal, wood, vinyl, or fiberglass, PVC, resin, clay, ceramic, and stone, for example.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A planter system comprising:
    a reshapeable bag including a growing medium, said reshapeable bag used for growing at least one of a seed and plant wherein an opening of a top of said reshapeable bag is adapted to receive a liquid used for growing said at least one of a seed and plant placed in said growing medium;
    a base used for placement under said reshapeable bag; and,
    at least one bag piercing element attached to said base wherein each said bag piercing element includes at least one opening for excess liquid waste drainage below said base and projects upwardly from said base wherein said base is adapted to drain said excess liquid waste through at least one said opening of said bag piercing element after said reshapeable bag is dropped upon said base and a bottom of said reshapeable bag is pierced on top of each said bag piercing element, said base further including side walls upwardly extending away from a perimeter of said base and a perimeter of a top of said side walls is greater than said perimeter of said base and dimensions of said reshapeable bag change upon traversal of said side walls after said reshapeable bag is dropped upon each said bag piercing element within said perimeter of said top of said side walls, said side walls further including a lower inner ledge and an upper inner ledge that are integrally formed along an inner perimeter of said side walls, said upper inner ledge positioned above said lower inner ledge and a pair of opposing side walls each having a horizontal opening traversing the width of each said side wall positioned between said lower inner ledge and said upper inner ledge wherein at least one removable interchangeable decorative planar surface insert is adapted to slide between each said horizontal side wall opening and secured between said lower inner ledge and said upper inner ledge, said planar surface including at least one opening to access said growing medium for said growing said at least one of a seed and plant.

2. The planter system, as set forth in claim 1, wherein each said bag piercing element is integrally formed with said base and rigidly attached thereto to form a unified planter assembly.

3. The planter system, as set forth in claim 1, wherein said base includes an opening corresponding to each said bag piercing element, each said base opening adapted to receive and support each said bag piercing element and each said bag piercing element is adapted to releasably attach by one of a press-fitting, snap-fitting, and screw-fitting each said bag piercing element to each corresponding said base opening.

4. The planter system, as set forth in claim 1, wherein said bag piercing element is generally conical in shape having a sharp apex adapted to pierce the bag and said at least one drainage opening positioned along a lateral surface of said bag piercing element.

5. The planter system, as set forth in claim 1, further including a top cover having at least one opening for said at least one a seed and plant to grow and side walls downwardly extending from a perimeter of said top cover.

6. The planter system, as set forth in claim 5, wherein a pair of opposing side walls of said top cover each have a horizontal opening traversing the width of each said side wall positioned near the intersection between an edge of said top cover and said side wall.

7. The planter system, as set forth in claim 6, further including a removable interchangeable decorative planar surface insert adapted to slide between each said horizontal side wall opening, said planar surface including at least one opening to access said growing medium for said growing said at least one a seed and plant.

8. The planter system, as set forth in claim 6, further including a first removable interchangeable decorative planar surface insert having at least one cut out of a first edge adapted to slide through a first horizontal side wall opening and releasably attach by one of a snap-fitting or press-fitting into at least one cut out of a second edge of a second removable interchangeable decorative planar surface insert adapted to slide through a second horizontal opposing side wall opening such that when each said cut out of said first edge and each said cut out of said second edge are fitted form said at least one opening to access said growing medium for said growing said at least one a seed and plant.

9. The planter system, as set forth in claim 5, wherein a bottom of said side walls of said top cover are adapted to releasably attach by one of a press-fitting and snap-fitting upon a perimeter of said base.

10. The planter system, as set forth in claim 5, wherein a perimeter of each said top cover opening includes a downwardly extending sharp lip integrally formed with each said top cover opening and rigidly attached thereto, each said sharp lip adapted to pierce a top of the bag to access said growing medium for said growing said at least one of a seed and plant.

11. The planter system, as set forth in claim 5, further including at least one trellis receptacle upwardly extending from and integrally formed with a top of said top cover and a trellis rod adapted to releasably attach by one of a press-fitting, snap-fitting, and screw-fitting upon each said trellis receptacle.

12. The planter system, as set forth in claim 1, wherein said base is one of a plurality of bases wherein each of said plurality of bases are stackable on top of each other due to said perimeter of said top of said side walls being greater than said perimeter of each said base.

13. A planter system comprising:
a bag including a growing medium, said bag used for growing at least one of a seed and plant wherein an opening of a top of said bag is adapted to receive a liquid used for growing said at least one of a seed and plant placed in said growing medium;
a base used for placement under said bag; and,
at least one bag piercing element attached to said base wherein each said bag piercing element includes at least one opening for liquid drainage below said base and projects upwardly from said base wherein said base includes an opening corresponding to each said bag piercing element, each said base opening is adapted to receive and support each said bag piercing element and each said bag piercing element is adapted to releasably attach by one of a press-fitting, snap-fitting, and screw-fitting each said bag piercing element to each corresponding said base opening, and said base is adapted to drain said liquid through at least one said opening of said bag piercing element after said bag is dropped upon said base and a bottom of said bag is pierced on top of each said bag piercing element.

14. The planter system, as set forth in claim 13, wherein said bag piercing element is generally conical in shape having a sharp apex adapted to pierce the sealed bag and said at least one drainage opening positioned along a lateral surface of said bag piercing element.

15. The planter system, as set forth in claim 13, further including a top cover having at least one opening for said at least one a seed and plant to grow and side walls downwardly extending from a perimeter of said top cover.

16. The planter system, as set forth in claim 15, wherein a pair of opposing side walls of said top cover each have a horizontal opening traversing the width of each said side wall positioned near the intersection between an edge of said top cover and said side wall.

17. The planter system, as set forth in claim 15, further including a removable interchangeable decorative planar surface insert adapted to slide between each said horizontal side wall opening, said planar surface including at least one opening to access said growing medium for said growing said at least one a seed and plant.

18. A method of growing at least one of a seed and plant comprising the steps of:
piercing a bottom side of a sealed bag including a growing medium by dropping said sealed bag atop of a planter base including at least one bag piercing element attached to said planter base wherein each said bag piercing element includes at least one opening for liquid drainage below said planter base and projects upwardly from said planter base, said planter base including an opening corresponding to each said bag piercing element, each said base opening is adapted to receive and support each said bag piercing element and each said bag piercing element is adapted to releasably attach by one of a press-fitting, snap-fitting, and screw-fitting each said bag piercing element to each corresponding said base opening;
opening a top side of said sealed bag to access said growing medium;
planting said at least one of a seed and plant within said growing medium;
pouring a liquid atop of said at least one seed and plant; and,
draining at least a portion of said liquid below said planter base through at least one said opening of said bag piercing element.

19. The method, as set forth in claim 18, wherein said bag piercing element is generally conical in shape having a sharp apex adapted to pierce the sealed bag and said at least one drainage opening positioned along a lateral surface of said bag piercing element.

20. The method, as set forth in claim 18, further including a top cover having at least one opening for said at least one a seed and plant to grow and side walls downwardly extending from a perimeter of said top cover.

21. A planter system comprising:
a reshapeable bag including a growing medium, said reshapeable bag used for growing at least one of a seed and plant wherein an opening of a top of said reshapeable bag is adapted to receive a liquid used for growing said at least one of a seed and plant placed in said growing medium;
a base used for placement under said reshapeable bag;

at least one bag piercing element attached to said base wherein each said bag piercing element includes at least one opening for excess liquid waste drainage below said base and projects upwardly from said base wherein said base is adapted to drain said excess liquid waste through at least one said opening of said bag piercing element after said reshapeable bag is dropped upon said base and a bottom of said reshapeable bag is pierced on top of each said bag piercing element, said base further including side walls upwardly extending away from a perimeter of said base and a perimeter of a top of said side walls is greater than said perimeter of said base and dimensions of said reshapeable bag change upon traversal of said side walls after said reshapeable bag is dropped upon each said bag piercing element within said perimeter of said top of said side walls; and a top cover having at least one opening for said at least one a seed and plant to grow and side walls downwardly extending from a perimeter of said top cover wherein a perimeter of each said top cover opening includes a downwardly extending sharp lip integrally formed with each said top cover opening and rigidly attached thereto, each said sharp lip adapted to pierce a top of the bag to access said growing medium for said growing said at least one of a seed and plant.

22. The planter system, as set forth in claim 21, wherein a pair of opposing side walls of said top cover each have a horizontal opening traversing the width of each said side wall positioned near the intersection between an edge of said top cover and said side wall.

23. The planter system, as set forth in claim 22, further including a removable interchangeable decorative planar surface insert adapted to slide between each said horizontal side wall opening, said planar surface including at least one opening to access said growing medium for said growing said at least one of a seed and plant.

24. The planter system, as set forth in claim 22, further including a first removable interchangeable decorative planar surface insert having at least one cut out of a first edge adapted to slide through a first horizontal side wall opening and releasably attach by one of a snap-fitting or press-fitting into at least one cut out of a second edge of a second removable interchangeable decorative planar surface insert adapted to slide through a second horizontal opposing side wall opening such that when each said cut out of said first edge and each said cut out of said second edge are fitted form said at least one opening to access said growing medium for said growing said at least one a seed and plant.

25. The planter system, as set forth in claim 21, wherein said side walls downwardly extend away from said perimeter of said top cover and a perimeter of a bottom of said side walls is greater than said perimeter of said top cover.

26. The planter system, as set forth in claim 25, wherein said top cover is one of a plurality of top covers each having respective side walls, a respective bottom, and a respective perimeter, and wherein each of said plurality of top covers are stackable on top of each other due to each said perimeter of each said bottom of each said side walls being greater than said perimeter of each said top cover.

27. The planter system, as set forth in claim 25, wherein said perimeter of said bottom of said side walls of said top cover equals said perimeter of said top of said side walls of said base and said bottom of said side walls of said top cover are adapted to releasably attach by one of a press-fitting and snap-fitting upon said top of said side walls of said base.

28. The planter system, as set forth in claim 21, further including at least one trellis receptacle upwardly extending from and integrally formed and rigidly attached thereto with a top of said top cover and a trellis rod adapted to releasably attach by one of a press-fitting, snap-fitting, and screw-fitting upon each said trellis receptacle.

29. A planter system comprising:
a reshapeable bag including a growing medium, said reshapeable bag used for growing at least one of a seed and plant wherein an opening of a top of said reshapeable bag is adapted to receive a liquid used for growing said at least one of a seed and plant placed in said growing medium;

a base used for placement under said reshapeable bag;

at least one bag piercing element attached to said base wherein each said bag piercing element includes at least one opening for excess liquid waste drainage below said base and projects upwardly from said base wherein said base is adapted to drain said excess liquid waste through at least one said opening of said bag piercing element after said reshapeable bag is dropped upon said base and a bottom of said reshapeable bag is pierced on top of each said bag piercing element, said base further including side walls upwardly extending away from a perimeter of said base and a perimeter of a top of said side walls is greater than said perimeter of said base and dimensions of said reshapeable bag change upon traversal of said side walls after said reshapeable bag is dropped upon each said bag piercing element within said perimeter of said top of said side walls; and a top cover having at least one opening for said at least one a seed and plant to grow and side walls downwardly extending from a perimeter of said top cover and a pair of opposing side walls of said top cover each have a horizontal opening traversing the width of each said side wall positioned near the intersection between an edge of said top cover and said side wall wherein a first removable interchangeable decorative planar surface insert having at least one cut out of a first edge is adapted to slide through a first horizontal side wall opening and releasably attach by one of a snap-fitting or press-fitting into at least one cut out of a second edge of a second removable interchangeable decorative planar surface insert adapted to slide through a second horizontal opposing side wall opening such that when each said cut out of said first edge and each said cut out of said second edge are fitted form said at least one opening to access said growing medium for said growing said at least one a seed and plant.

30. The planter system, as set forth in claim 29, wherein said perimeter of said bottom of said side walls of said top cover equals said perimeter of said top of said side walls of said base and said bottom of said side walls of said top cover are adapted to releasably attach by one of a press-fitting and snap-fitting upon said top of said side walls of said base.

\* \* \* \* \*